(12) United States Patent  
Cherchi et al.

(10) Patent No.: US 9,088,016 B2  
(45) Date of Patent: Jul. 21, 2015

(54) STACK OF IMPROVED FUEL CELLS AND ELECTRIC POWER GENERATOR COMPRISING SAID STACK

(75) Inventors: Pierpaolo Cherchi, Turin (IT); Luca Mercante, Collegno (IT); Giuseppe Gianolio, Callarengo (IT); Ilaria Rosso, Pinerolo (IT); Denis Bona, Trofarello (IT)

(73) Assignee: Electro Power Systems S.p.A., Moncalieri (Torino) (IT)

( * ) Notice: Subject to any disclaimer, the term of this patent is extended or adjusted under 35 U.S.C. 154(b) by 186 days.

(21) Appl. No.: 13/877,640

(22) PCT Filed: Oct. 4, 2011

(86) PCT No.: PCT/IB2011/054368  
§ 371 (c)(1),  
(2), (4) Date: Jun. 3, 2013

(87) PCT Pub. No.: WO2012/046192  
PCT Pub. Date: Apr. 12, 2012

(65) Prior Publication Data  
US 2013/0316260 A1 Nov. 28, 2013

(30) Foreign Application Priority Data  
Oct. 4, 2010 (IT) ............... TO2010A0805

(51) Int. Cl.  
*H01M 8/04* (2006.01)  
*H01M 8/02* (2006.01)  
*H01M 8/24* (2006.01)  
*H01M 8/10* (2006.01)

(52) U.S. Cl.  
CPC ........ *H01M 8/04029* (2013.01); *H01M 8/0267* (2013.01); *H01M 8/04007* (2013.01);*H01M8/04074* (2013.01); *H01M 8/2465* (2013.01); *H01M 8/04701* (2013.01); *H01M 8/04768* (2013.01); *H01M 2008/1095* (2013.01); *H01M 2250/10* (2013.01); *Y02B 90/14* (2013.01); *Y02E 60/50* (2013.01)

(Continued)

(58) Field of Classification Search  
CPC .................................................. H01M 8/04029  
USPC ......................................................... 429/434  
See application file for complete search history.

(56) References Cited

U.S. PATENT DOCUMENTS 6,040,073 A * 3/2000 Okamoto ..................... 429/437  
2008/0026274 A1 1/2008 Zhang et al.

FOREIGN PATENT DOCUMENTS

DE    102009013648    9/2009  
EP    0823743         2/1998  
EP    1387424         2/2004

OTHER PUBLICATIONS

International Search Report and Written Opinion for International Application No. PCT/IC2011/054368; 9 Pages.

*Primary Examiner* — Karie O'Neill Apicella  
(74) *Attorney, Agent, or Firm* — R. Rushena Patent Agent, LLC

(57) ABSTRACT

The invention relates to a stack (200) comprising a plurality of stacked fuel cells (100), fixed and fluidically connected to a first head (210), which comprises: a feeding inlet (301) for a fuel flow and a corresponding outlet (302); a feeding inlet (303) for a comburent flow and a corresponding outlet (306); a feeding inlet (302) and a corresponding outlet (305) for a flow of a cooling heat-transfer fluid thermally coupled with the fuel cells (100) in order to remove at least part of the reaction heat at the fuel cells (100) themselves; the first head (210) comprising a feeding inlet (307) and a corresponding outlet (308) for a flow may pass, said volume being thermally coupled with the cooling heat-transfer fluid flow, so that the cooling heat-transfer fluid delivers at least some of the heat removed from the fuel sells (100) to the working heat-transfer fluid.

9 Claims, 4 Drawing Sheets

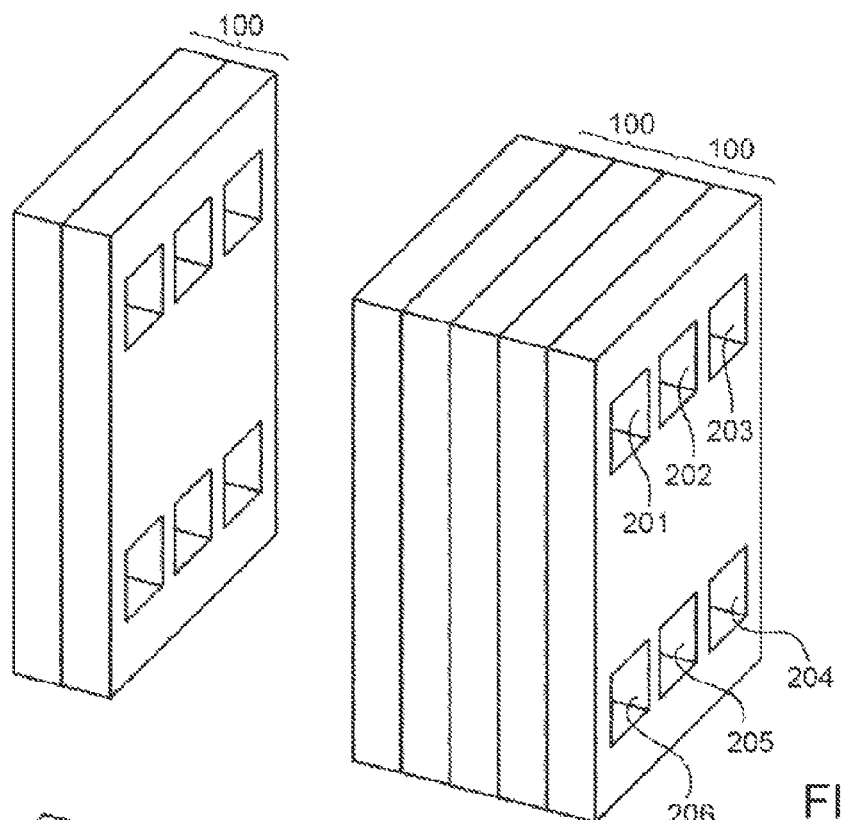
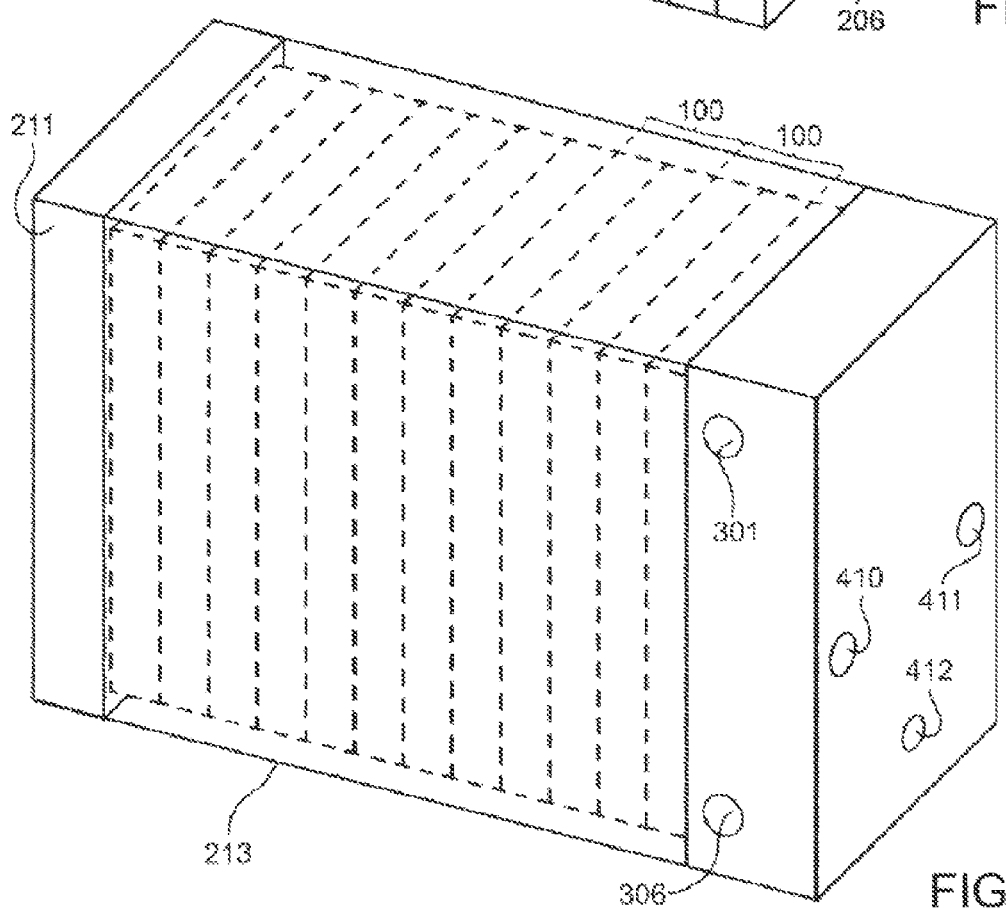
FIG. 2
FIG. 3

STACK OF IMPROVED FUEL CELLS AND ELECTRIC POWER GENERATOR COMPRISING SAID STACK

TECHNICAL FIELD

The present invention relates to a stack of fuel cells and an electric power generator comprising said stack.

More particularly, the invention relates to a stack of fuel cells based on PEM technology (proton exchange membranes).

BACKGROUND ART

As known, stacks of this type are conveniently used to generate electric power using the electrochemical reaction between hydrogen and oxygen, producing only water and are, therefore, considered a source of clean energy from the environmental point of view. The number of cells stacked in series to form the stack determines the total voltage thereof.

A stack of this type is, typically, the main component of a power generator. For correct operation, within a power generator, the stack is typically fluidically connected to a feeding and discharge circuit of gaseous currents of reactants and products, and to a cooling system (comprising, in turn, a pump, pipes, dissipaters, etc.) through which a fluid passes, e.g. water, and designed to remove excess heat from the stack developed by the above mentioned electrochemical reaction. In addition, the stack is generally operatively linked to a control system adapted to monitor a number of critical physical quantities (temperature, flow, pressure, voltage of single cell, total voltage, etc.).

To take into account above all the particular employment conditions which are utilized at an increasing extent (for example, to account for the use of a fuel cell generator as a source of electric back-up power) there is, in the field, the need to reduce the overall size of the group formed by the stack and by the auxiliary components to which it is connected within the generator, so as to reduce, therefore, the overall size and weight of an electric power generator that uses the stack itself.

Increasingly, therefore, in the art there is a need to provide a stack of fuel cells in which an increased compactness is accompanied by an improved efficiency, for example in terms of thermal integration and energy exchanges, ensuring generally high standards of performance and reliability. Moreover, it is highly desirable to provide a fuel cell stack which is compact and efficiently controllable and which has reduced response times, in order to ensure compliance with the requirements of electric power users.

DISCLOSURE OF INVENTION

It is therefore an object of the present invention to provide a stack of fuel cells which makes it possible for at least one of the abovementioned requirements to be satisfied in a simple and economical way.

The abovementioned aim is achieved by the present invention, as it relates to a stack of fuel cells as defined in claim 1.

BRIEF DESCRIPTION OF THE DRAWINGS

For a better understanding of the present invention, a preferred embodiment thereof is described in the following, purely by way of non limitative example, with reference to the drawings of the attached Figures, in which:

FIG. 2 is a schematic perspective view of a group of stacked cells of the type shown in FIG. 1;

FIG. 3 is a schematic perspective view of a stack of fuel cells according to the present invention;

BEST MODE FOR CARRYING OUT THE INVENTION

Figure 1:
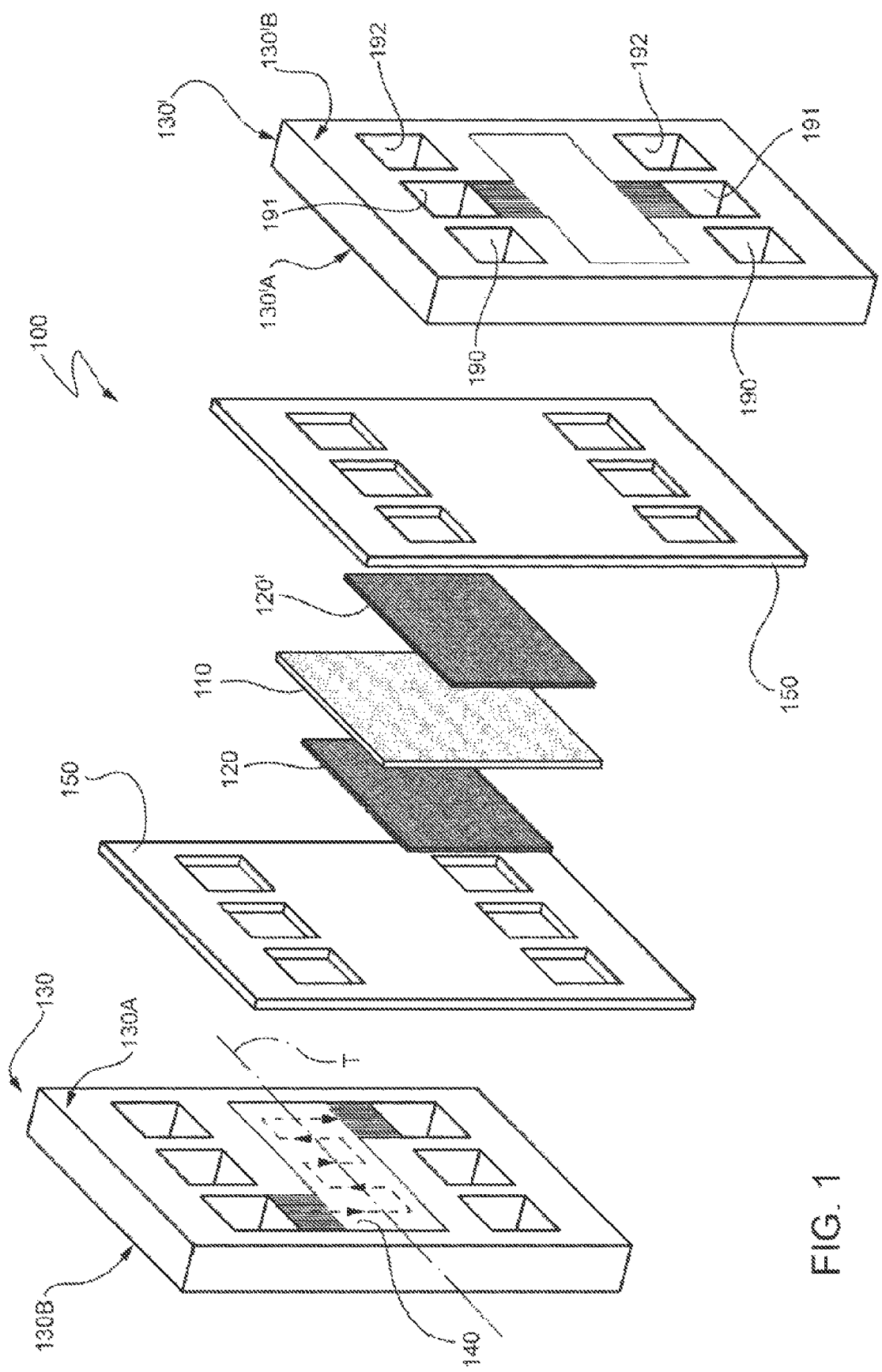
FIG. 1 is an exploded schematic perspective view of a fuel cell.

In FIG. 1 a fuel cell is schematically illustrated and indicated with 100. Each cell 100 comprises, as a main constitutive component, an electrode membrane group 110, to which hereafter will be referred to, for simplicity, with the corresponding English acronym MEA (membrane electrode assembly).

In particular, the cell 100 typically comprises a MEA 110 placed between two layers 120 and 120' of gas diffusion (often also indicated as GDL, an acronym of the corresponding English expression "gas diffusion layer"). The group consisting of MEA 110 and GDL 120 and 120' is, in turn, comprised between a first and a second bipolar plate 130 and 130'.

More particularly, the MEA 110 comprises a proton exchange membrane coated, on opposite sides, by respective layers of catalytic material.

The first bipolar plate 130 defines, on a respective surface 130A facing the MEA 110, a flow field 140 comprising a plurality of channels adapted, respectively, to distribute, through the relative GDL 120, an inlet flow of hydrogen at the anode of the MEA 110, where the half-reaction $2H_2 \to 4H^+ + 4e$ (1) takes place, and to collect any outlet unreacted hydrogen flow in excess.

The second bipolar plate 130' defines, on a respective surface 130A' facing the MEA 110, a flow field (whose location is shown in FIG. 1 with 140') comprising a plurality of channels adapted, respectively, to distribute through the respective GDL 120', an inlet flow of comburent (for example air or oxygen) to the cathode of the MEA, where the half-reaction $O_2 + 4H^+ + 4e \to 2H_2O$ (2) takes place, and to collect the outlet flow of water produced by the reaction and any unreacted/surplus comburent flow.

In addition, the first and second bipolar plate 130 and 130' sealingly cooperate, at respective peripheral portions, with at least one gasket 150 sandwiched between bipolar plates 130 and 130' themselves. In this way, when the set of bipolar plates 130, 130', the gasket 150 and MEA is assembled, inside said set a chamber is defined within which the MEA is sealingly housed.

In addition, the first and second bipolar plate 130 and 130' define, on respective faces 130B and 130B' opposite to the surfaces 130A and 130A', respective flow fields comprising respective plurality of channels. FIG. 1 shows only the flow field 170' formed in the second bipolar plate 130'. Preferably, these flow fields have substantially the same development.

When two cells 100 are aligned and fixed one to another, the respective faces 130B and 130B' sealingly cooperate with a respective gasket (not shown). In this way, the flow fields 170 and 170' define a plurality of ducts through which a cooling heat-transfer fluid (e.g. water) may pass in order to remove from each cell 100 at least part of the heat in excess developed by the overall reaction given by the sum of the two abovementioned half-reactions (1) and (2).

In addition, first and second bipolar plates 130 and 130' have, typically, three pairs of openings 190, 191 and 192. In the case illustrated in FIG. 1, the openings 190, 191 and 192 have a rectangular section and are arranged in a substantially symmetrical way with respect to a transverse axis T of the first and second bipolar plates 130 and 130'. Correspondingly, the gasket 150 has three pairs of openings 190', 191' and 192', which are also arranged symmetrically with respect to an axis T' transverse to the gasket 150 and so as to substantially overlap the corresponding openings 190, 191 and 192 of the bipolar plates 130 and 130'.

In this way, when a plurality of cells 100 are stacked and reciprocally fixed to form a stack 200, as shown in FIG. 2, the pairs of openings 190, 191 and 192 of first and second bipolar plates 130 and 130', together with the openings 190', 191' and 192' of the gaskets 150, define:
- a duct 201 for feeding hydrogen (fuel);
- a duct 202 for feeding cooling fluid;
- a duct 203 for feeding comburent (oxygen, air, etc. . . . )
- an outlet duct 204 of hydrogen (fuel) in excess/unreacted;
- an outlet duct 205 of the cooling fluid;
- an outlet duct 206 of the comburent in excess/unreacted and of the reaction products (water).

In the case illustrated in FIG. 2, due to the geometry of the flow fields obtained in the bipolar plates 130 and 130' described above, the hydrogen feeding duct 201 and the outlet excess/unreacted hydrogen duct 204 are respectively arranged at the top and bottom of the stack 200. Similarly, the ducts 202 and 205, respectively, for the feeding and the outlet of cooling fluid, are respectively arranged at the top and bottom of the stack 200. Finally, the feeding comburent duct 203 and the relative outlet duct 206 are respectively arranged at the top and bottom of the stack 200.

Figure 4:
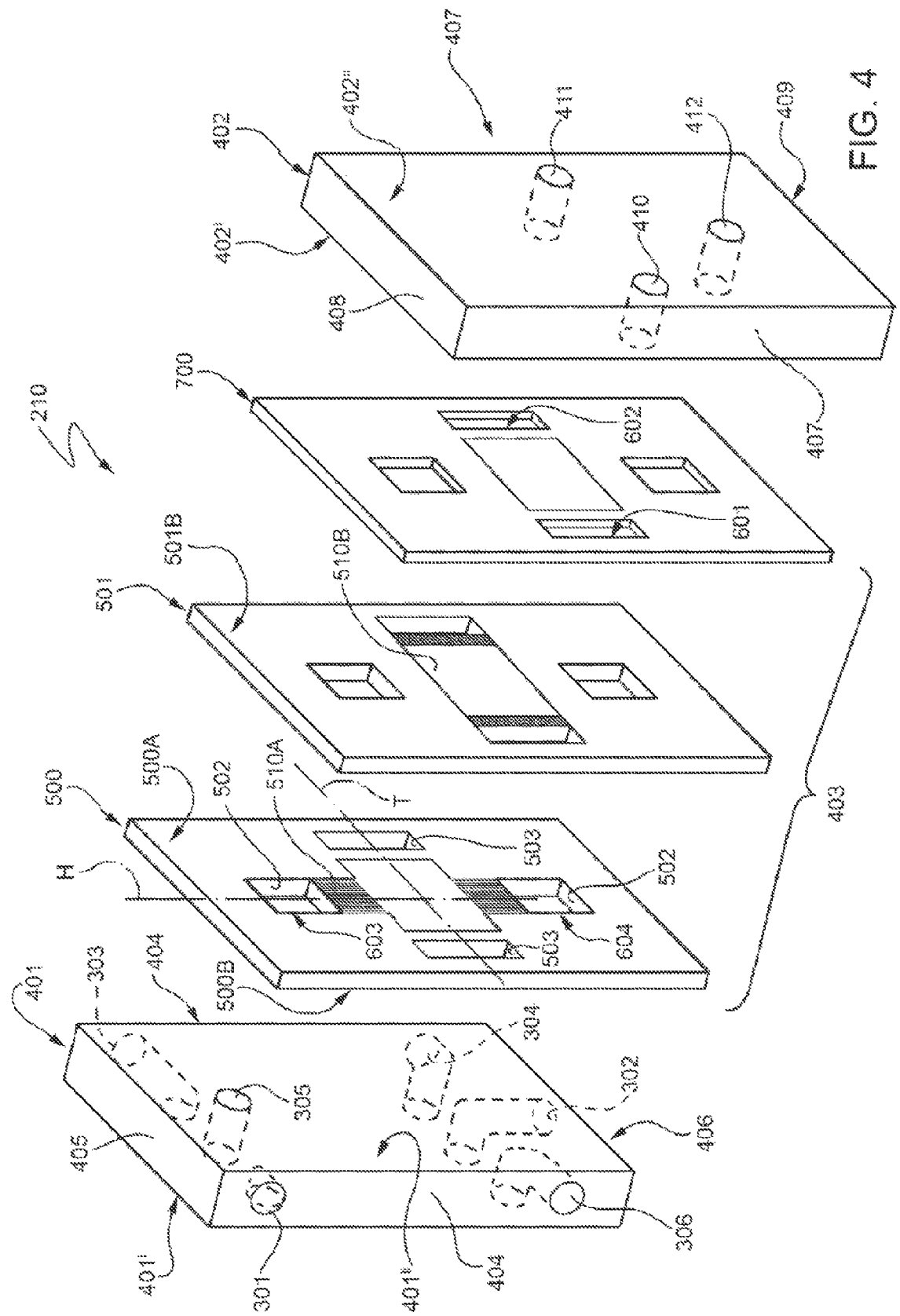
FIG. 4 is a schematic perspective view of a first head of the stack of FIG. 3.
Figure 5:
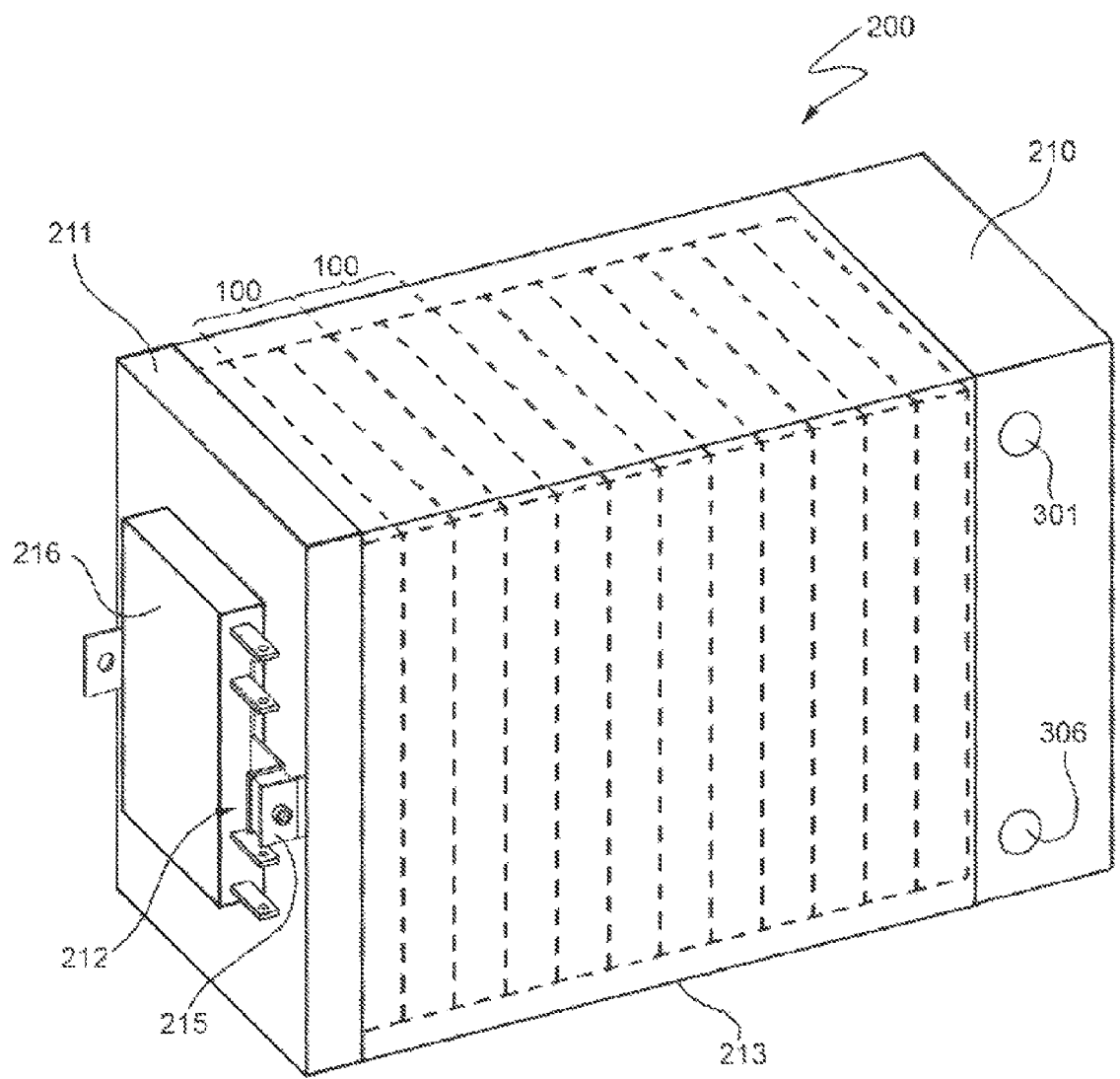
FIG. 5 is a further schematic perspective view from the opposite side of the stack of fuel cells shown in FIG. 3.

The stack 200 comprises (FIG. 3), as well as a plurality of cells 100 connected in series, and whose total number influence in a manner substantially proportional to the total voltage obtainable at the extremes of the stack 200, a first and a second head 210 and 211 and at least one current collector 212 (FIG. 4). In addition, the stack 200 is preferably covered by a shell 213. The heads 210 and 211 are structurally bonded through a system of tie rods (not shown).

The heads 210 and 211 are primarily a function of the structural support of the other components of the stack 200. In particular, the cells 100 connected in series result comprised between the first and second head 210 and 211.

At the same time, at the level of at least one of the heads 210 and 211 are made fluidic connections for the feeding of the reactants and for the discharge of reaction products/reactants in excess. Moreover, always at the level of at least one of the heads 210 and 211 are made fluidic connections for the feeding and the discharge of the cooling heat-transfer fluid of the stack 200.

In the case illustrated, the first head 210 comprises:
- a feeding inlet 301 of hydrogen (fuel);
- a feeding inlet 302 of the cooling heat-transfer fluid;
- a feeding inlet 303 of the comburent (oxygen, air, etc. . . . )
- an outlet 304 of hydrogen (fuel) in excess/unreacted;
- an outlet 305 of the cooling heat-transfer fluid;
- an outlet 306 of the comburent in excess/unreacted and reaction products (water).

In addition, the first head 210 advantageously comprises a feeding inlet 307 of a working heat-transfer fluid flow and an outlet 308 of the same flow. The first head 210 also defines, advantageously, in its inside, a volume through which said working heat-transfer fluid flow thermally couplable with the cooling heat-transfer fluid may pass.

In other words, the first head 210 defines, in its inside, a heat exchanger corresponding with, in use, the cooling heat transfer fluid that has removed and accumulated, passing through the flow fields 170, 170', the excess heat produced in the stack 200 from the oxidation reaction, delivers, at least in part, said heat to the working heat-transfer fluid flow.

Preferably, the heat exchanger 310 is entirely contained within the head 210. More particularly, the structure of the first head 210 is illustrated in detail in FIG. 4.

The first head 210 comprises a first and a second end plate 401 and 402 having a development substantially parallelepiped and dimensions comparable with those of bipolar plates 130 and 130' described above, and at least one heat exchange module 403. The heat exchange module 403 is, in turn, comprised between the first and second end plate 401 and 402.

The feeding inlet 301 of hydrogen (fuel), the feeding inlet 302 of the cooling heat-transfer fluid, the feeding inlet 303 of the comburent (oxygen, air, etc.), the outlet 304 of hydrogen (fuel) in excess/unreacted, the outlet 305 of the cooling heat-transfer fluid and the outlet 306 of the comburent in excess/unreacted and of the reaction products (water) are defined internally by the first end plate 401.

In the case illustrated, the first end plate 401 has a first face 401' and a second face 401" opposite to each other, respectively, and facing, in use, the rest of the stack 200 and the heat exchange module 403; and two side walls 404, an upper wall 405 and a lower wall 406.

Similarly, the second end plate 402 has a first face 402' and a second face 402" opposite to each other, the first face 402' is facing, in use, the heat exchange module 403; two side walls 407, an upper wall 408 and a lower wall 409.

As shown in FIG. 4, the feeding inlet 301 of hydrogen, the outlet 303 of the comburent, the outlet 304 of hydrogen in excess/unreacted and the outlet 306 of the comburent in excess/unreacted and of reaction products are obtained in the side walls 404 of the first end plate 401. For a more simplified implementation, in particular as concerns the fluidic connections with the stack, the feeding inlet 302 and the outlet 305 of the cooling heat-transfer fluid returning from the stack 200 are obtained instead in the second face 401" and in the lower wall 406 of first end plate 401, respectively.

Moreover, in the second end plate 402 are formed an inlet 410 and an outlet 411 of the working heat-transfer fluid flow and an outlet 412 of the cooling heat-transfer fluid flow.

The heat exchanger module 403 comprises a first and second plate 500 and 501 of the heat exchange module, which are identical, but arranged one rotated by 180' with respect to the other with reference to a longitudinal axis H. In addition, the module 403 comprises at least one gasket 700 adapted to sealingly cooperate, for example with the second plate 501 and the second end plate 402.

For the sake of convenience, in the following only the first plate 500 will be described.

The first plate 500 of the heat exchange module has two first openings 502 symmetrically arranged with respect to the transverse axis T of the first plate 500 and crossed, essentially, by the longitudinal axis H of the plate 500 itself. In addition, the first plate 500 has two second openings 503 arranged symmetrically with respect to the longitudinal axis H of the first plate 500, in respective lateral portions of the first plate 500 itself.

In addition, the first plate 500 defines, on a respective surface 500A facing the second plate 501, a first flow field 510A comprising a plurality of ducts through which the working heat-transfer fluid flow may pass and in fluidic communication with the second openings 503.

The first plate 500 also defines, on a respective surface 500B opposite to the surface 500A and facing the first end plate 401, a second flow field 510B comprising a plurality of ducts through which the cooling heat-transfer fluid flow may pass and in fluidic communication with the first openings 502.

Since, as mentioned, the second plate 501 of the heat exchange module is rotated with respect to the first plate 500, by 180' around the longitudinal axis H, it defines a corresponding flow field 510A on a surface 501A facing the first plate 500 and a corresponding flow field 510B on a surface 501B facing the second end plate 402. In this way, when the first and the second plate 500 and 501 of the heat exchange module are stacked and fixed one to the other to form, with the first and second end plate 401 and 402 the heat exchanger module 403, the openings 502 and 503 of the first and second plate 501 and 502 define:

- an inlet duct 601 through which the working heat-transfer fluid flow may pass;
- an outlet duct 602 through which the working heat-transfer fluid flow may pass;
- an inlet duct 603 to the head through which the cooling heat-transfer fluid flow may pass; and
- an outlet duct 604 from the head through which of cooling heat-transfer fluid flow may pass.

In the case illustrated in FIG. 4, by virtue of the geometry of the flow fields 510A and 510B obtained on plates 501 and 502 of the heat exchange module, the duct 601 and the duct 602 are arranged in the lateral portions of the first head 210, while the duct 603 and the duct 604 are arranged respectively on the top and bottom part of the first head 210 of the stack 200.

The first and second plate 501 and 502 are made of a material having appropriate thermal conduction properties in order to facilitate the heat exchange between the two flows of cooling heat-transfer fluid and working heat-transfer fluid.

In this way, the cooling heat-transfer fluid flow is fed in at the level of the first head 210 through the inlet 302, substantially passing through the fuel cell 100 removing at least part of the excess heat locally developed from the electrochemical reaction to then return to the first head 210 itself through the outlet. Here, said flow flows along the inlet duct 603, crossing the flow field 510A between the first plate 500 and the second plate 501 and then flows along the duct 604 to leave the first head 210 through the outlet 412. Note that, once leaving the first head 210, the outlet cooling heat-transfer fluid flow can be recirculated by a pump, at the inlet 302.

Moreover, in this way, the working heat-transfer fluid flow is fed in at the level of the first head 210 through the inlet 410, flowing along the duct 601, crossing the flow field 510B between the second plate 501 and the second end plate 402, to then go along the outlet duct 602 and leave the head 211 through the outlet 411.

In this way, thermal coupling between the cooling heat-transfer and working heat-transfer fluid flows is achieved; the cooling heat-transfer and working heat-transfer fluid flows lapping from opposite faces the second plate 501, through which heat is exchanged, whereby at least part of the excess heat developed by the reaction and removed from the cooling heat-transfer fluid is transferred to the working heat-transfer fluid.

The current collector 212 (FIG. 4) comprises an electrically conductive plate element (not shown), which is electrically connected to the stack 200 itself and substantially contained in its inside. More particularly, the current collector 212 is electrically connected to an end cell 100 of the stack 200 and is substantially housed within the stack 200, except for a connection portion 215 that protrudes (see FIG. 4) outside the shell 213 of the stack 200. More particularly, the abovementioned plate element of the collector 212 has one of its surfaces facing and in contact with the MEA of the closest cell 100 to the second head 211. Outside the shell 213 of the stack 200, the connecting portion 215 is electrically connected and releasably fixed to a DC/DC converter 216, which is conveniently releasably fixed to the second head 211.

The outlet current from the stack is usually addressed to an inductor whose purpose is to dampen current harmonics generated by the DC/DC converter 216, in order to reduce the total harmonic component of current drawn from the stack 200. Advantageously, the above-described connecting portion 215 acts as a coil of an inductor required for the damping of current harmonics.

In this way, compared to other known solutions, the length of the electrical connections between stack and inductor is significantly limited and, consequently, so is the magnitude of the harmonics radiated therefrom.

Since the DC/DC converter 216 develops, in use, heat, it is typically provided with heat-dissipating means.

Advantageously, the DC/DC converter 216 is also thermally coupled with the working heat-transfer fluid flow. In particular, the wall on which the DC/DC converter 216 is fixed is conveniently lapped internally, on the opposite side from the converter fixing, by the working heat-transfer fluid flow flowing through the flow field 170 or 170' of the fuel cell 100 closest to the second head 211.

The stack 200 also comprises, advantageously, a plurality of sensor means (not shown in the Figures) of corresponding relevant parameters for the process of producing electric power, such as, in particular, temperature, pressure and conductivity for the cooling heat-transfer fluid (which flows along the flow fields between cells 100); temperature, pressure and humidity for the gas streams of reactants and inlet/outlet products from the stack 200; etc.

Preferably, such sensor means are housed directly within the stack 200, so as to obtain a high measurement accuracy. More particularly, said sensor means can be suitably housed in proximity to the housings of the gaskets 150, or at the flow fields 170. Said sensor means are operatively connected to a control unit (not shown), which is programmed to adjust, based on the physical quantity values detected by the sensor means and of set-point parameters which can be predetermined, or selected from time to time by the user, the flow rate of cooling heat-transfer and working heat-transfer fluid flows within the stack. For this purpose, the control unit is operatively connected to the sensor means housed in the stack, as well as to suitable flow regulation means arranged on respective ducts described above.

In use, by appropriate adjustment of cooling heat-transfer and working heat-transfer fluid flows within the stack, the temperature of the system is thus advantageously maintained within a predetermined range which is optimal for the stack operation.

By an examination of the characteristics of the stack according to the present invention it becomes obvious the benefits that it allows.

In particular, the stack 200 according to the present invention provides a particularly effective conditioning of the thermal energy. The creation of a hydraulic circuit inside the stack 200, within which a cooling heat-transfer fluid flows and shared, essentially, between the stack 200 itself and the DC/DC converter 216, makes it possible to reduce the startup time of an electric power generator using the stack 200. Furthermore, by reducing the number of structurally independent components and the physical distance between the components themselves, it is possible to minimize thermal drift and thermal gradients between different parts of the power generator that, in use, develop heat.

In addition, the stack 200 according to the present invention facilitates a more efficient conditioning of electric energy. Since the inductor 214 is inserted within the stack 200, it is possible to limit the bulk and to increase the compactness of the system, reducing the number of structurally independent components and the physical distance between the parts responsible for the generation of electric power and the parts that, instead, implement and manage the conversion. Moreover, with the stack 200 of the invention, it is possible to reduce harmonic emissions by radiation related to the connections, and ohmic losses are significantly limited. The need for insulating materials is also greatly reduced and the efficiency of the converter is substantially improved, since the elimination of contacts and connections increases the overall reliability of the converter itself.

The possibility of measuring process parameters directly inside the stack 200, then, significantly improves the accuracy and reliability of measurements and, therefore, enables a more rational and advantageous use of components, with a view to increasing power density, while at the same time limiting the risks associated with any localized over-heating.

Finally, it shall be apparent that changes and modifications may be made to the system as described and illustrated herein which do not extend beyond the scope of protection of the independent claims.

The invention claimed is:

1. A stack comprising:
   a first head;
   a plurality of stacked fuel cells, which are fixed and fluidically connected to said first head;
   said first head comprising:
      a feeding inlet for a fuel flow and a corresponding outlet;
      a feeding inlet for a comburent flow and a corresponding outlet;
      a feeding inlet and a corresponding outlet for a flow of a cooling heat-transfer fluid thermally coupled with said fuel cells so as to remove at least part of the reaction heat at the fuel cells;
   wherein said first head comprises a feeding inlet and a corresponding outlet for a flow of working heat-transfer fluid, said first head internally defining a volume through which said working heat-transfer fluid flow passes, said volume being thermally coupled with said cooling heat-transfer fluid flow, so that the cooling heat-transfer fluid delivers at least part of the heat removed from the fuel cells to the working heat-transfer fluid;
   and wherein said stack is further comprising:
      a current collector which comprises: an electrically conductive plate element, electrically connected to the stack and substantially contained therein;
      a connection portion that protrudes outside the stack and electrically connected to a DC/DC converter releasably fixed to the stack.

2. The stack according to claim 1, wherein said first head comprises at least one thermal exchange module comprising a first and a second plate of the module; said first and second plates of the module defining said volume, through which said working heat-transfer fluid flow passes, and a volume, through which said cooling heat-transfer fluid flow passes, said volumes being thermally coupled to one another.

3. The stack according to claim 1, comprising a second head opposite to said first head, said fuel cells being comprised between said first and second head.

4. The stack according to claim 1, comprising a duct through which the fuel passes and which is fluidically connected to the fuel feeding inlet and to the corresponding outlet.

5. The stack according to claim 1, comprising a duct through which the comburent passes and which is fluidically connected to the comburent feeding inlet and to the corresponding outlet.

6. The stack according to claim 1, comprising a duct through which the cooling heat-transfer fluid passes and which is fluidically connected to the cooling heat-transfer fluid feeding inlet and to the corresponding outlet.

7. The stack according to claim 1, wherein said DC/DC converter is thermally coupled with said cooling heat-transfer fluid flow.

8. The stack according to claim 1, further comprising a plurality of sensor means housed within the stack for the detection of at least one physical quantity relating to a flow flowing through the stack, and a control unit operatively connected with said sensor means and with adjusting means of the flow rates of the flows of cooling heat-transfer fluid and working heat-transfer fluid.

9. An electric power generator comprising a stack according to claim 1.

* * * * *